W. P. MILLER.
Saws.

No. 151,043.            Patented May 19, 1874.

Witnesses:            Inventor:

J. B. Bullock            Warren P. Miller.
Wm. B. Casey

UNITED STATES PATENT OFFICE.

WARREN P. MILLER, OF NEW YORK, N. Y.

IMPROVEMENT IN SAWS.

Specification forming part of Letters Patent No. 151,043, dated May 19, 1874; application filed March 7, 1874.

*To all whom it may concern:*

Be it known that I, WARREN P. MILLER, of the city, county, and State of New York, have invented a new and useful Improvement in Saws; and I do hereby declare that the following is a full, clear, and exact description of the construction and operation of the same, reference being had to the annexed drawings, making a part of this specification, in which—

Figure 1:
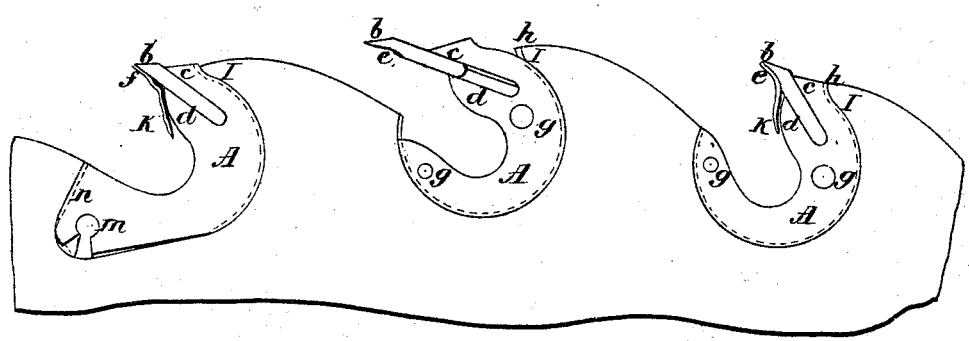
Figures 3, 4:
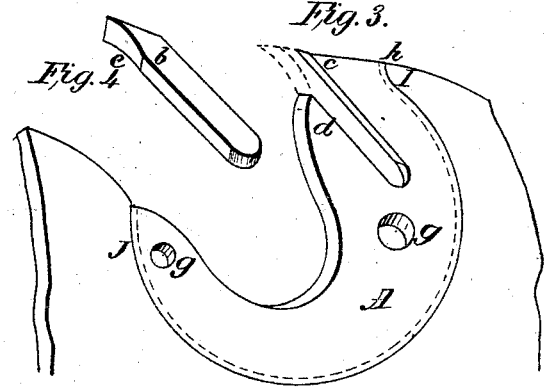
Figure 2:

Figure 1 is a section of saw-plate with three teeth. Fig. 2 is a cross-section of the plate, showing the matchings of the plate with a shank; Fig. 3, a shank to which the teeth proper are attached. Fig. 4 is a perspective view of one of the teeth.

Letter A is a circular shank, fitted in the periphery of the saw-plate, provided with suitable sockets to receive the movable teeth; c, the back jaw of the shank; d, front jaw of shank; e, circular recesses in the front of tooth; f, shows a tooth with a straight front. g are holes through the shank, for the purpose of attaching a wrench to turn the shank in and out of the sockets. h is where the shank stops against the end of the socket; I, saw-plate; J, front side of a socket. k represents chip being cut from timber.

The nature of my invention consists in providing shanks for movable saw-teeth, said shanks being fitted to sockets in the saw-plate, and each shank having a socket formed in it to receive a movable tooth, and also in forming a circular recess in the front of the movable tooth, so that the chip, when passing, will be conducted free over the front jaw of the shank.

To enable others skilled in the art to make and use my invention, I will proceed to describe its construction and operation.

I form circular sockets all around in the periphery of the plate, with a V on the inner edge, as shown in Fig. 2; then prepare shanks A, Fig. 3, the exact size of said sockets, with a groove in the edge, terminating at h with a shoulder. The top is slotted so as to form the two jaws c and d. The jaw c has a V formed on the edge to fit a corresponding groove cut in the back of the tooth; they are given a spring temper; they are then struck with a hammer on the side near the inner circle, so as to make them a little larger than sockets in the plate.

The teeth are formed of steel, as shown in Fig. 4, with a V-groove in the back to fit the socket, and a recess formed in the front, so as to terminate at the top of the front jaw of the shank. The edge is made enough wider than the plate is thick to allow it to run clear of the timber. The shanks, having been made larger than the sockets, will be compressed when turned into place between I and J. Jaw c will be pressed against the tooth, and the tooth thus held by friction between the two jaws.

When it is desired to remove a tooth a suitable wrench is applied to the shank, by which it is turned forward into the position shown by the center tooth in Fig. 1; thus the pressure is removed from c. In this position the tooth can be removed from the socket and another inserted. The shank is then turned back into position.

The object of forming sockets in the shanks to receive the teeth is, that the jaw c may act as a shield to protect the end of the plate I from being bruised or broken in case the teeth are run on iron or like obstruction. The shanks are made interchangeable, and, if damaged, readily replaced by new ones.

The object of forming the circle or recess C in the front of the teeth is, to cause the chip k, Fig. 1, to bend and run free over the front jaw of the shank, as shown in the tooth at the right hand of the figure. Thus the jaw is saved from rapid wear, and a great saving in power is effected as compared with a tooth having a straight front, as that shown at the left hand of the figure.

The shank of the tooth at the left hand of the figure is different in form from all the others.

The stud m is pivoted, and, by turning the bottom forward, will allow the toe of the shank n to drop, thus relieving the pressure from c, that the tooth may be removed.

I give the last-mentioned illustration to show that the teeth may be inserted in shanks of various forms.

What I claim as my invention, and desire to secure by Letters Patent, is—

The shank A, provided with a socket to receive the movable teeth b, having the recess e in the front thereof, and arranged, with relation to the jaw d of the shank, as and for the purpose described.

WARREN P. MILLER.

Witnesses:
J. B. BULLOCK,
WM. B. CASEY.